C. CRETORS.
CORN POPPER.
APPLICATION FILED JAN. 15, 1912.
1,075,550.
Patented Oct. 14, 1913.
2 SHEETS—SHEET 2.
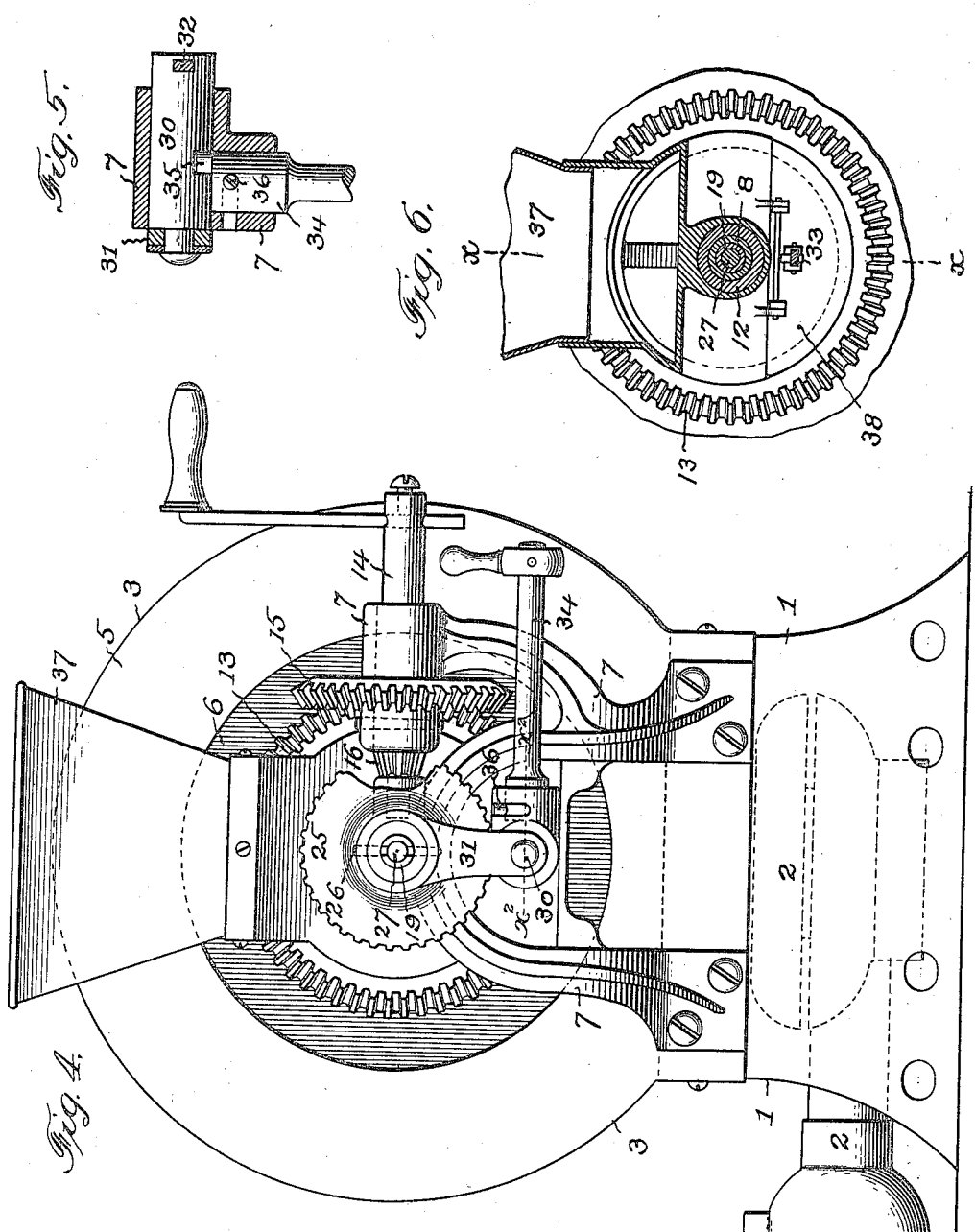
Attest:
Chas. H. Buell
Henry Moe
Inventor:
Charles Cretors,
By Robert Burns
Atty.

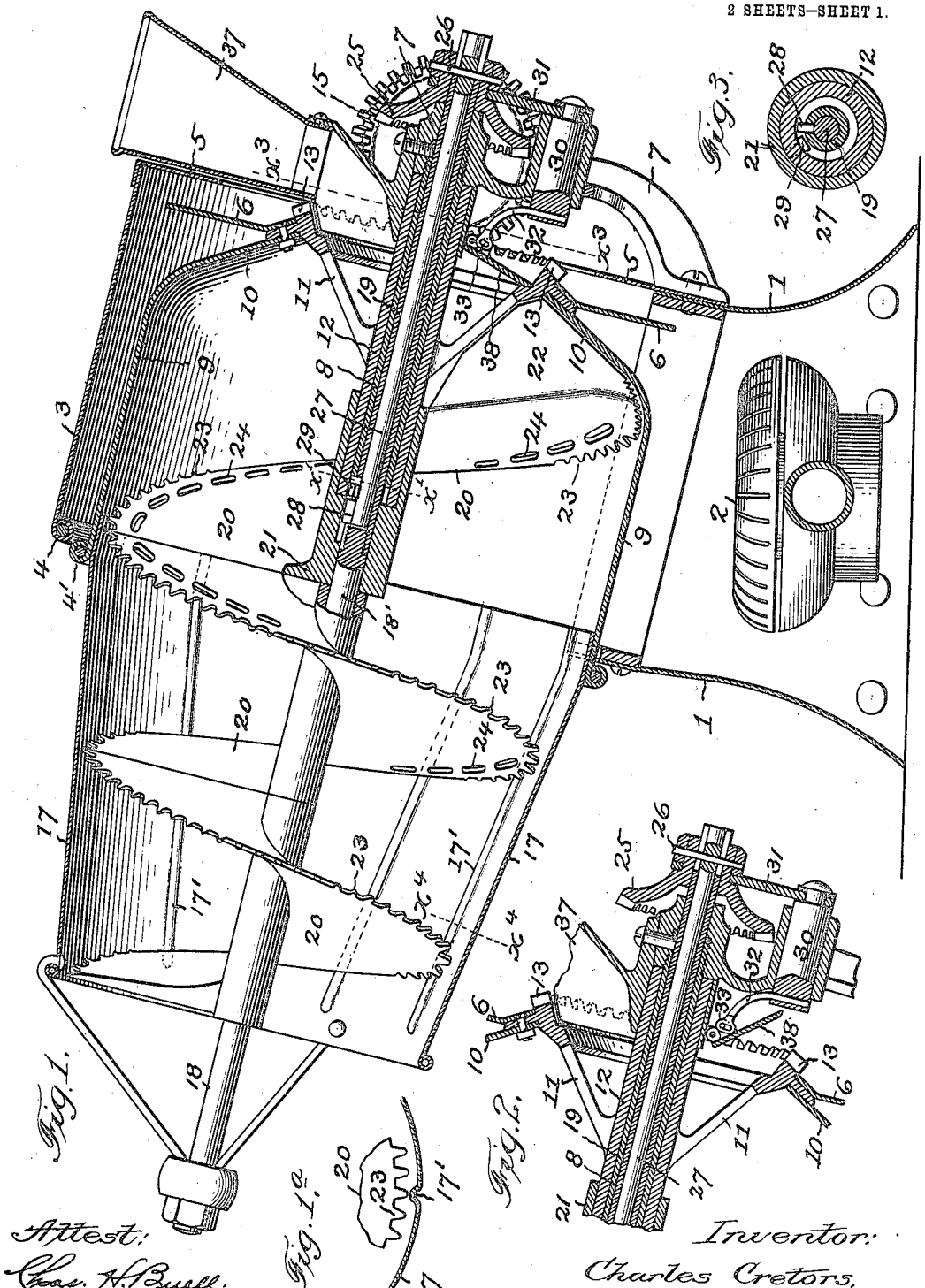

UNITED STATES PATENT OFFICE.

CHARLES CRETORS, OF CHICAGO, ILLINOIS.

CORN-POPPER.

1,075,550. Specification of Letters Patent. Patented Oct. 14, 1913.

Application filed January 15, 1912. Serial No. 671,366.

*To all whom it may concern:*

Be it known that I, CHARLES CRETORS, a citizen of the United States of America, and a resident of Chicago, in the county of Cook, State of Illinois, have invented certain new and useful Improvements in Corn-Poppers, of which the following is a specification.

This invention relates to that class of apparatus for popping corn, in which the popped corn is discharged as fast as the same has been properly popped. And the present improvement has for its object to provide a simple and efficient construction and combination of parts by which the corn as fast as popped is removed from the heated zone of the apparatus, and in its passage to the discharge end of the apparatus is separated from the unpopped material in a very effective and continuous manner, all as will hereinafter more fully appear.

In the accompanying drawings:—Figure 1, is a central longitudinal section on line $x$—$x$, Fig. 6, of an apparatus constructed in accordance with the present invention. Fig. 1ª is a detail transverse section, on line $x^4$—$x^4$, Fig. 1. Fig. 2, is a fragmentary longitudinal section, illustrating the open position of the discharge gate through which the residuum is discharged at the end of the popping operation. Fig. 3, is an enlarged detail section on line $x'$—$x'$, Fig. 1, of the concentric operating shafts of the apparatus and the clutch between the same. Fig. 4, is a rear end view of the apparatus. Fig. 5, is an enlarged detail horizontal section on line $x^2$—$x^2$, Fig. 4. Fig. 6, is a detail transverse section on line $x^3$—$x^3$, Fig. 1.

Similar reference numerals indicate like parts in the several views.

Referring to the drawings, 1 represents the hollow supporting base of the apparatus, and 2 a burner of any ordinary type arranged therein, and preferably a gaseous fuel burner as shown.

3 is an annular casing secured to the top of the base 1 and having communication therewith to receive the heated products of combustion from the burner 2, aforesaid. The casing 3, is formed at front with an inturned marginal bead or flange 4, which in conjunction with a similar flange or bead 4' on the rotary popping vessel, hereinafter described, provides an annular exit passage at the forward end of the apparatus for part of the products of combustion, and to such end said beads or flanges have a separated relation as shown in Fig. 1. At its rear end the casing 3 is formed with an inturned flange 5, open at its center, to provide a rear exit passage for parts of the products of combustion, and with a view to prevent too great an escape at such point, the rotary popping vessel or cylinder will be provided with a circular disk 6, of a greater diameter than, and arranged in adjacent relation to said exit passage.

7 is a journal bracket attached to the rear end of the apparatus and provided at its upper end with a fixed and forwardly extending bearing sleeve 8, the central bore, as well as the periphery, of which form bearings for the hereinafter described shafts and hubs of the popping vessel and spiral conveyer.

9 is the popping cylinder or vessel, open at its forward end and closed at its rear end by a cup shaped head 10, the central portion of which is formed by a cone shape open spider 11, which in turn is provided with a hub or sleeve 12 that has revoluble bearing upon the periphery of the stationary bearing sleeve 8, aforesaid, to provide the requisite support for the popping vessel 9 in the revolution thereof.

13 is a bevel gear wheel, preferably forming a part of the spider 11, aforesaid, and having driven engagement with the driving bevel gear wheel hereinafter described.

14 is a transversely arranged countershaft journaled in a bearing box on the journal bracket 7 aforesaid, and carrying a bevel gear wheel 15 having driving engagement with the above described bevel gear wheel 13 of the popping vessel, and a bevel pinion 16, having driving engagement with the hereinafter described bevel gear wheel of the spiral conveyer. Motion may be imparted to the countershaft 14, by hand or by power as found most desirable.

17 is a truncated cone shape casing forming an extension of the forward end of the cylindrical popping vessel 9, and having open forward end for the final discharge of the popped corn. In the present construction the casing 17 is preferably formed with a series of inwardly projecting longitudinal ribs or corrugations 17' for the purpose of aiding the conveyer in separating the popped from the unpopped corn. In addition said cone will carry at its forward end a spider hub to provide a bearing for the conveyer carrying shaft now to be described.

18 is the conveyer carrying shaft, extending axially the length of the popping cylinder 9 and casing 17, and preferably formed by a forward shaft section 18' and a tubular rear shaft section 19, screwed together at their meeting ends as shown. As so formed the rear shaft section 19 will have support and bearing in the bore of the stationary bearing sleeve 8 of the journal bracket 7, above described.

20 is the spiral conveyer above referred to, and which is preferably made in three sections, for convenience in manufacture, assemblage and subsequent removal and replacement when worn or broken. The two forward sections of said conveyer have central longitudinal hubs by which they are secured to the forward section 18' of the conveyer shaft 18, while the rear conveyer section has a central hub 21 formed for attachment to the rear end of the shaft section 18' and for bearing upon the forward end of the hub or sleeve 12 of the popping vessel 9, hertofore described.

22, is a rear wing or blade extending longitudinally from the rear section of the spiral conveyer 20, and adapted mainly to act as a stirrer for the unpopped corn during the operation of the apparatus. In the preferred form of the present invention, the spiral conveyer 20 is made of approximately the same diameter as the popping vessel 9 and its cone extension 17, and the margin of the conveyer is formed by a series of projecting teeth or prongs 23, arranged in separated relation, to provide clearance spaces at the periphery of the separator for the return passage of the unpopped corn back into the popping vessel for further treatment, while the popped corn is engaged by said teeth or prongs 23, and gradually moved to the outlet of the aforesaid casing 17.

24 are a series of perforations formed in the spiral conveyer 20, near the outer margin of the same, and adapted to provide supplementary return passages through which the unpopped corn can return to the popping chamber, in the continued operation of the apparatus.

25 is a bevel gear wheel having driving engagement with the rear end of the tubular rear shaft section 19 aforesaid, preferably by means of a transverse key 26 adapted for limited movement in longitudinal slots in the end of said shaft section, as shown in Figs. 1, and 2, and for the function hereinafter set forth. The bevel gear wheel 25 meshes with and is driven by the bevel pinion 16, of the countershaft 14, heretofore described, during the ordinary operation of the apparatus.

27 is a clutch rod arranged in the bore of the rear shaft section 19 and having limited longitudinal movement therein. At its rear end said rod 27 is fixedly connected to the hub of the bevel gear wheel 25 by the aforesaid transverse key 26, as shown, so as to have rotary movement and longitudinal adjustment in unison with said bevel gear wheel. At its forward end the rod 27 carries a lateral clutch lug 28, which when said rod is in its forward position during the popping operation of the apparatus, is in engagement with a slit or recess in the bore of the hub 21 of the conveyer 20 and so that said hub 21 and forward shaft section 18' are in clutch engagement with the rear shaft section 19 and bevel gear wheel 25, and pinion 16, to receive rotation therefrom. When the clutch rod 27 is moved into its rear position, the clutch lug 28 slides in the aforesaid slit or recess of the hub 21, and has engagement at the side of an instanding lug 29 in the bore of bearing sleeve 12 of the popping cylinder 9, to attain a rotation of the spiral conveyer in the same direction as said popping cylinder, and in an opposite direction of the normal direction of the rotation of said conveyer in the popping operation of the apparatus. Such last described connection prevails during the operation of discharging the residuum from the popping cylinder 9 after the popping operation is completed.

The longitudinal adjustment of the clutch rod 27 and bevel gear wheel 25, above referred to, is attained by the following arrangement of parts: 30 is a longitudinally moving block sliding in the bore of a housing extension of the journal bracket 7 aforesaid, and connected at one end by a yoke member 31 with the hub of the bevel gear wheel 25, aforesaid. At its other end said block 30, carries an arm 32 adapted for operative engagement through a pin and elongated slot formation 33, with the hinged discharge gate, hereinafter described. 34 is a manually actuated rock shaft journaled transversely in the aforesaid housing extension of the journal bracket 7, and provided with a crank pin 35 having operative engagement in a lateral recess in the aforesaid block 30, so that with a partial rotation of rock shaft 34 in one direction or the other, the required longitudinal adjustment of the block 30, clutch rod 27 and bevel gear wheel 25, is attained, as well as the opening and closing of the discharge gate above referred to. 36 is a radial pin or projection on the rock shaft 34, and having movement in a semi-circular slot in the aforesaid housing extension of the journal bracket 7, to limit the turning movement of the rock shaft in either direction.

37 is a stationary charging hopper located at the rear end of the apparatus and preferably carried by the journal bracket 7 as shown. The lower end of said hopper 37 is turned forward to fit the upper portion of the rear end of the cone shape open spider 11 before described, so that the corn as introduced into said hopper will be directed into the interior of the popping cylinder or vessel 9.

38 is a discharge gate pivoted at its upper end to the journal bracket 7, and formed with a semi-circular free end adapted to fit an annular recess in the rear end of the aforesaid spider 11, and attain a close joint between the parts, as the said spider rotates with the popping cylinder 9 during the operation of the apparatus. The gate 38 is connected by the aforesaid pin and elongated slot connection 33 with the movable block 30, aforesaid, and is held in a closed condition during the normal popping operation of the apparatus. When, however, the bevel gear wheel 25, clutch rod 27 and their accessories are rearwardly adjusted to effect a rotation in one direction of the popping cylinder 9 and spiral conveyer 20, the gate 38, through the before described connections, will be moved into an open position, so that with a continued rotation of the popping cylinder and spiral conveyer as above stated, the stirrer blade 22, will lift the residuum in the popping cylinder to a plane above the gate opening to effect a discharge of said residuum from the apparatus.

In the present construction the popping cylinder, spiral conveyer and their immediate accessories, are arranged in a position inclined from a horizontal plane, and with the outlet end of the cone shape casing 17 at the highest point of elevation. As so arranged the operation of the spiral conveyer 20 in moving the popped corn toward the outlet of the apparatus acts against the tendency of the material to return to the popping chamber by gravity, and such tendency to return is materially increased by the upwardly inclined lower side of the cone shape casing 17. In consequence a very effective separation of the popped corn from the unpopped corn, is effected during the travel of the material to the discharge end of the apparatus.

In the operation of the apparatus a quantity of unpopped corn being introduced into the popping cylinder 9, through the charging hopper 37, with the apparatus in motion the popping cylinder receives a fast rotation in one direction, while the spiral conveyer 20, receives a slow rotation in the reverse direction, through the intermediate driving mechanism heretofore described in detail. As a result the material receives a constant and efficient stirring action, so that any liability to charring of the corn is prevented, and at the same time the popped corn as fast as formed is taken by the conveyer and discharged from the apparatus.

Having thus fully described my said invention, what I claim as new and desire to secure by Letters Patent is:—

1. In an apparatus for popping corn, the combination of a revoluble popping vessel having a discharge opening at its rear end, a non-revoluble gate closing said discharge opening, a spiral conveyer arranged longitudinally in said popping vessel, a heater casing inclosing said vessel, a heater arranged in said casing, means for supporting the popping vessel and conveyer in operative relation, and means for imparting rotation to the popping vessel and conveyer.

2. In an apparatus for popping corn, the combination of a supporting frame, a revoluble popping vessel having a filling and a discharge opening at its rear end, a stationary hopper connecting with said filling opening, a non-revoluble gate carried by the supporting frame and closing said discharge opening, a spiral conveyer arranged longitudinally in said popping vessel, a heater casing inclosing said vessel, a heater arranged in said casing, means for supporting the popping vessel and conveyer in operative relation, and means for imparting rotation to the popping vessel and conveyer.

3. In an apparatus for popping corn, the combination of a popping vessel, a spiral conveyer arranged longitudinally in said vessel and having a series of radial prongs at its margin, a heater casing inclosing said vessel, a heater arranged in said casing, means for supporting the popping vessel and conveyer in operative relation, and means for imparting rotation to the popping vessel and to the conveyer.

4. In an apparatus for popping corn, the combination of a popping vessel, a forward extension on said vessel of a truncated cone form and open at its forward end, a spiral conveyer arranged longitudinally in said vessel and extension and having a series of radial prongs at its margin, a heater casing inclosing said vessel, a heater arranged in said casing, means for supporting the popping vessel and conveyer in operative relation, and means for imparting rotation to the popping vessel and to the conveyer.

5. In an apparatus for popping corn, the combination of a popping vessel, a spiral conveyer arranged longitudinally in said vessel and having a series of radial prongs at its margin and a series of orifices in adjacent relation to said prongs, a heater casing inclosing said vessel, a heater arranged in said casing, means for supporting the popping vessel and conveyer in operative relation, and means for imparting rotation to the popping vessel and to the conveyer.

6. In an apparatus for popping corn, the combination of a popping vessel, a forward extension on said vessel of a truncated cone form and open at its forward end, a spiral conveyer arranged longitudinally in said vessel and extension and having a series of radial prongs at its margin, and a series of orifices in adjacent relation to said prongs, a heater casing inclosing the popping vessel, a heater arranged in said casing, means for supporting the popping vessel and conveyer in operative relation, and means for imparting rotation to the popping vessel and to the conveyer.

7. In an apparatus for popping corn, the combination of a supporting frame, a revoluble popping vessel having a discharge opening at its rear end, a non-revoluble gate carried by the supporting frame and closing said discharge opening, a spiral conveyer arranged longitudinally in said popping vessel, a heater casing inclosing said vessel, a heater arranged in said casing, means for supporting the popping vessel and conveyer in operative relation, and means for imparting rotation to the popping vessel and conveyer, the same comprising a countershaft having individual driving bevel gear connections with the popping vessel and with the conveyer, and a clutch mechanism adapted to release the driving connection of the conveyer with the countershaft and engage the conveyer with the popping vessel.

8. In an apparatus for popping corn, the combination of a supporting frame, a revoluble popping vessel having a filling and a discharge opening at its rear end, a stationary hopper connecting with said filling opening, a non-revoluble gate carried by the supporting frame and closing said discharge opening, a spiral conveyer arranged longitudinally in said popping vessel, a heater casing inclosing said vessel, a heater arranged in said casing, means for supporting the popping vessel and conveyer in operative relation, and means for imparting rotation to the popping vessel and conveyer, the same comprising a countershaft having individual driving bevel gear connections with the popping vessel and with the conveyer, and a clutch mechanism adapted to release the driving connection of the conveyer with the countershaft and engage the conveyer with the popping vessel.

9. In an apparatus for popping corn, the combination of a popping vessel, a forward extension on said vessel of a truncated cone form, open at its forward end and formed with a series of longitudinal corrugations, a spiral conveyer arranged longitudinally in said vessel and extension, a heater casing inclosing said vessel, a heater arranged in said casing, means for supporting the popping vessel and conveyer in operative relation, and means for imparting rotation to the popping vessel and conveyer.

10. In an apparatus for popping corn, the combination of a popping vessel, a forward extension on said vessel of a truncated cone form, open at its forward end and formed with a series of longitudinal corrugations, a spiral conveyer arranged longitudinally in said vessel and extension, and having a series of radial prongs at its margin, a heater casing inclosing said vessel, a heater arranged in said casing, means for supporting the popping vessel and conveyer in operative relation, and means for imparting rotation to the popping vessel and conveyer.

11. In an apparatus for popping corn, the combination of a popping vessel, a forward extension on said vessel of a truncated cone form, open at its forward end and formed with a series of longitudinal corrugations, a spiral conveyer arranged longitudinally in said vessel and extension and having a series of radial prongs at its margin and a series of orifices in adjacent relation to said prongs, a heater casing inclosing said vessel, a heater arranged in said casing, means for supporting the popping vessel and conveyer in operative relation, and means for imparting rotation to the popping vessel and conveyer.

Signed at Chicago, Illinois, this 12th day of January, 1912.

CHARLES CRETORS.

Witnesses:
ROBERT BURNS,
HENRY MOE.